May 7, 1940.  W. R. UHLEMANN  2,199,581
LENS MOUNTING TOOL
Filed Dec. 3, 1938
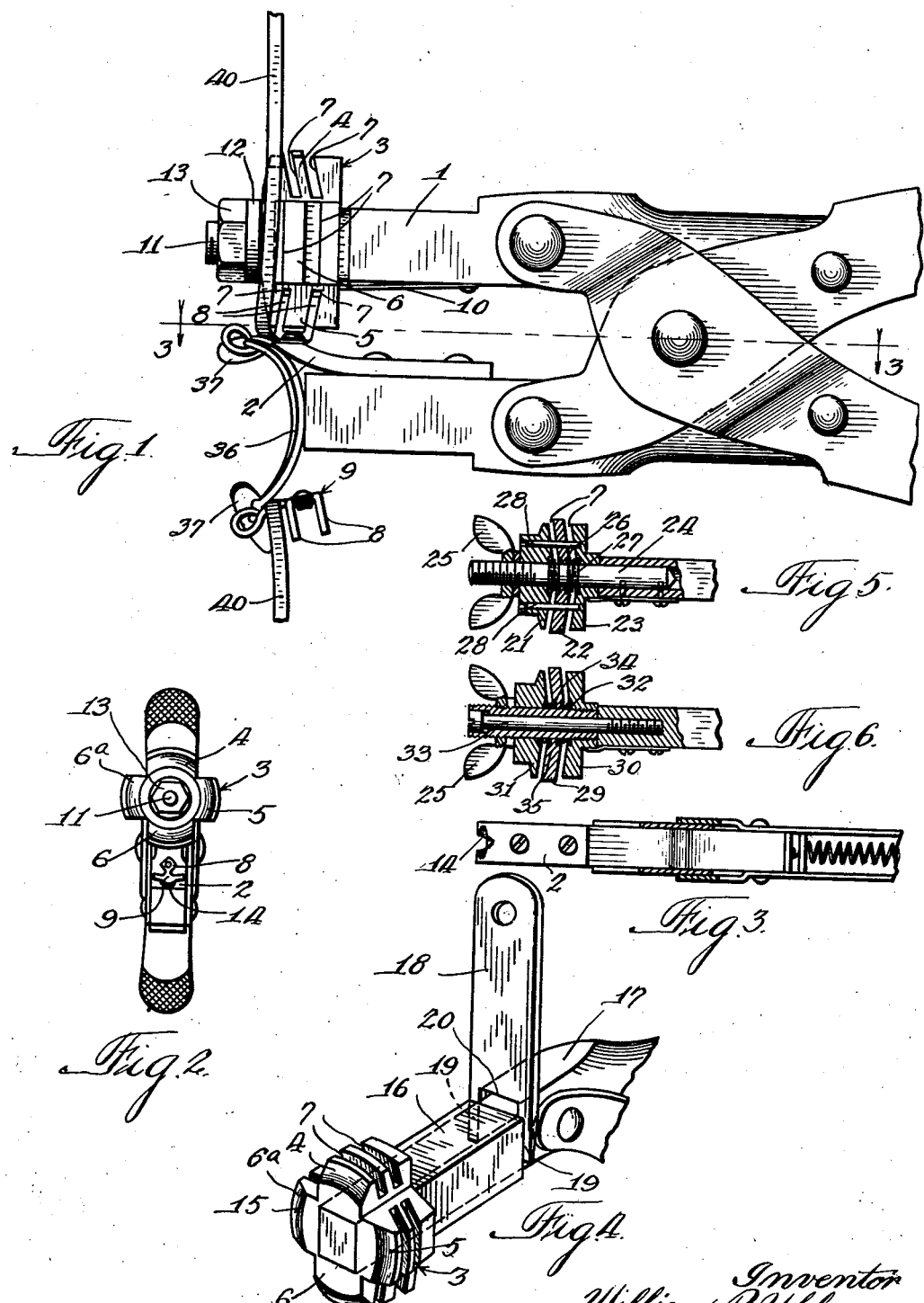
Inventor
William R. Uhlemann
By Ams, Thiess, Olsen & Mecklenburger
Attys Patented May 7, 1940

2,199,581

UNITED STATES PATENT OFFICE 2,199,581

LENS MOUNTING TOOL

William R. Uhlemann, Evanston, Ill.

Application December 3, 1938, Serial No. 243,736

4 Claims. (Cl. 81—3.6)

My invention relates to lens mounting tools.

One of the objects of my invention is to provide a tool for spacing the lens edge embracing portions of a mounting strap for ophthalmic lenses.

Ophthalmic lenses are of different thicknesses and require different spacings of the lens embracing portions of the mounting straps. These mounting straps may come from the manufacturer with the lens edge embracing portions uniformly spaced, for example, with a spacing of 2.5 millimeters. The lenses to which these straps are to be fitted may require straps varying in spacing from 1.5 millimeters to 3 millimeters. As indicated above, it is one of the objects of my invention to provide a tool whereby these straps, as they come from the manufacturer, may be quickly and accurately adjusted to give a spacing anywhere from 1.5 millimeters to 3 millimeters or an even wider range if necessary.

In the drawing, in which two embodiments of my invention are shown:

Figure 1 is a side elevational view showing the tool in operative position with respect to a mounting strap;

Fig. 2 is an elevational view of the tool from the left of Fig. 1;

Fig. 3 is a detailed sectional view on the line 3—3 of Fig. 1;

Fig. 4 is a perspective view showing a somewhat different form of tool;

Fig. 5 is an axial sectional view showing another embodiment of the invention; and Fig. 6 is an axial sectional view showing still another embodiment.

Referring to the drawing in detail, and first to Figs. 1, 2, and 3, the tool shown comprises a pair of jaws 1 and 2 movable toward and from each other, one of said jaws carrying a forming device 3 rotatably mounted thereon having a plurality of circumferentially spaced forming portions 4, 5, 6, and 6a, any one of which may be brought into operative relation with respect to the opposing jaw 2, each forming portion having a pair of parallel spaced grooves 7 therein to receive the lens edge embracing portions 8 of a mounting strap 9, whereby, as shown in Fig. 1, when the strap is placed in position for the lens edge embracing portions 8 to enter the grooves 7 and the jaws are moved toward each other, the lens edge embracing portions will be forced into the grooves 7 by the opposing jaw 2 to give the lens edge engaging portions the desired spacing.

The spacing of the grooves 7 of each pair may be different, the spacing varying in a graduated manner so that if, for example the spacing of the strap portions as they come from the factory is 2.5 millimeters and it is desired to reduce the spacing to 1.5 millimeters, this may be accomplished by successive operations. Thus, the first operation may be performed by a portion of the forming head having a groove spacing of 2 millimeters, and the next operation may be performed by a portion of the forming device in which the grooves have a 1.5 millimeter spacing. The grooved portions of the rotatable forming head may be held in proper alignment with the opposing jaw by means of a flat leaf spring 10, the free edge of which engages flattened portions on the rotatable forming head 3. The forming head may be rotatably mounted on a stud 11 extending from the jaw 1 and may be held on the stud by means of a suitable washer 12 and nut 13.

The contour of the forming jaws, as shown in Fig. 2, may be curved so as to conform substantially to the curvature of the lens mounting straps 9. As shown in Figs. 2 and 3, the lower opposing jaw 2 may have a notch 14 formed therein to provide clearance for a supporting wire or the like on which the strap may be mounted.

In Fig. 4 is shown a somewhat modified form of the tool in which the forming head 15 is mounted on a sleeve 16 rectangular in cross section, which sleeve has a friction fit with one of the jaws 17 of the tool. With this form of tool, the forming head may be slipped off from the jaw of the tool and slipped on again in a different position to bring a different set of grooves into operative relation with respect to the opposing jaw. Also, if desired, or necessary, a sleeve carrying one set of forming grooves may be slipped off and another sleeve carrying a different set of forming grooves may be slipped on in place thereof.

In order to remove the sleeve from the jaw in case it sticks, a suitable instrument 18 may be provided having a bifurcated portion, the arms 19 of which straddle the jaw 17 and engage the edges of the sleeve 16. A portion of the sleeve removing instrument may engage a shoulder 20 on the jaw so that by manipulating the bifurcated instrument as a lever about the shoulder portion 20 on the jaw, the arms of the tool may be made to engage the edges of the sleeve and move it away from the shoulder.

It will be noted that the center lines between the entrance portions of each pair of grooves lie substantially in a common plane perpendicular to the axis of the rotatable forming head so that each pair of grooves will align itself properly with respect to the opposing jaw 2 when brought into operative relation therewith.

When the tool is used with a strap having a leaf spring lens edge engaging portion riveted to the strap, the notch in the opposing jaw may be omitted so that the jaw will back up the rivet or other fastening device by means of which the leaf spring may be secured to the strap.

It may sometimes be desirable that the construction be such that the width of the grooves 7 may be varied. If the width of the groove is only slightly greater than the thickness of the flanges 8 and if the spacing of the flanges 8 is somewhat different from the spacing of the grooves 7, it may be a difficult matter to force the flanges 8 into the grooves 7. In the construction shown in Fig. 5, an adjustment is provided whereby the width of the grooves or openings 7 may be changed. With this construction, the forming device may be so adjusted that the openings 7 will be relatively wide with respect to the thickness of the flanges 8 during the first part of the operation in which the flanges 8 are being forced into the grooves 7 and so that thereafter the width of the grooves may be reduced to form the flanges accurately to the desired spacing. This is accomplished by making the forming device in three sections 21, 22, and 23 capable of relative movement, the spacing between the sections providing the grooves 7 into which the flanges 8 are forced. In the construction shown, the three sections, or at least two of them, are mounted for sliding movement on the pivot pin 24. For adjusting the forming sections, a wing nut 25 may be provided, threaded onto the end of the pivot pin 24, which nut when tightened up will compress the springs 26 and 27 which tend to separate the sections of the forming head. The three sections of the forming head thus constitute clamping members for causing the portions 8 of the mounting strap to be clamped snugly against the intermediate clamping member 22, thus insuring an accurate spacing of the portions 8. In order to insure that the three sections of the forming head will turn as a unit, pins 28 are secured to the inner clamping member 23, which pins extend into openings in the other two clamping members.

In using this forming tool, the wing nut 25 may be adjusted so that the flanges 8 of the strap will enter easily into the grooves or openings formed between the clamping members, the final forming movement being accomplished by screwing up the wing nut to clamp the flanges of the strap snugly against the intermediate clamping member 22.

The construction shown in Fig. 6 is quite similar to that shown in Fig. 5 except that in Fig. 6 the inner clamping member 29 also is axially movable, the wing nut 25 serving to clamp the inner and outer clamping members 30 and 31 snugly against the intermediate clamping member 29. In this form, the inner clamping member 30 is rigidly secured to a sleeve 32 which has a limited sliding movement on the supporting pivot 33. The outer clamping member 31 is slidably mounted on this sleeve 32 so that when the wing nut 25 is tightened up, it will draw the inner and outer clamping members 30 and 31 toward each other against the action of the separating springs 34 and 35. The outer and intermediate clamping sections 31 and 29 may be non-rotatably mounted on the rotatable sleeve, as by squaring that portion of the sleeve which extends through these clamping members.

The lens mount as shown may be of any suitable construction; that shown comprising a bridge 36, a pair of nose guards 37, the straps 9 referred to, and the temple mounting wires 40 suitably secured to the straps or bridge.

The operating mechanism of the pliers shown may be of any usual or suitable construction, so designed that the jaws of the pliers will move toward and from each other in substantially parallel relation.

Further modifications will be apparent to those skilled in the art and it is desired, therefore, that the invention be limited only by the prior art and the scope of the appended claims.

Having thus described my invention, what I claim and desire to secure by Letters Patent is:

1. A tool for spacing the lens edge embracing portions of a mounting strap for ophthalmic lenses comprising a pair of jaws movable toward and from each other, one of said jaws carrying a forming device having a pair of parallel slots therein spaced apart the distance desired between the lens edge embracing portions to receive the edges of said lens edge embracing portions, respectively, whereby when the strap is placed in position for said lens edge embracing portions to enter the slots and the jaws are moved toward each other, the lens edge embracing portions will be forced into said slots by the opposing jaw to give said embracing portions the desired spacing.

2. A tool for spacing the lens edge embracing portions of a mounting strap for ophthalmic lenses comprising a pair of jaws movable toward and from each other and a forming device mounted for rotative adjustment on one of said jaws, said forming device having a plurality of circumferentially spaced forming portions, any one of which may be brought into operative relation with respect to the opposing jaw by rotative adjustment, each forming portion having a pair of parallel slots therein spaced apart the distance desired between the lens edge embracing portions to receive the edges of said lens edge embracing portions, respectively, whereby when the strap is placed in position for said lens edge embracing portions to enter the slots and the jaws are moved toward each other, the lens edge embracing portions will be forced into said slots by the opposing jaw to give said embracing portions the desired spacing.

3. A tool for spacing the lens edge embracing portions of a mounting strap for ophthalmic lenses comprising a pair of jaws movable toward and from each other, one of said jaws carrying a forming device having a pair of parallel slots therein spaced apart the distance desired between the lens edge embracing portions to receive the edges of said lens edge embracing portions, respectively, whereby when the strap is placed in position for said lens edge embracing portions to enter the slots and the jaws are moved toward each other, the lens edge embracing portions will be forced into said slots by the opposing jaw to give said embracing portions the desired spacing, said opposing jaw having a notch therein to provide clearance for the strap supporting part of the lens mounting.

4. A tool for spacing the lens edge embracing portions of a mounting strap for ophthalmic lenses comprising a pair of jaws movable toward and from each other, one of said jaws carrying a forming device comprising three clamping members spaced to provide a pair of parallel slots spaced apart the distance desired between the lens edge embracing portions to receive the edges of said lens edge embracing portions, respectively, whereby when the strap is placed in position for said lens edge embracing portions to enter the slots and the jaws are moved toward each other, the lens edge embracing portions will be forced into said slots by the opposing jaw to give said embracing portions the desired spacing, said clamping members being mounted for relative movement to force said lens edge engaging portions against the intermediate clamping member.

WILLIAM R. UHLEMANN.